US009314852B2

(12) United States Patent
Santamarina et al.

(10) Patent No.: US 9,314,852 B2
(45) Date of Patent: Apr. 19, 2016

(54) RIGHT ANGLE ATTACHMENT FOR POWER TOOLS

(71) Applicant: BLACK & DECKER INC., Newark, DE (US)

(72) Inventors: Aland Santamarina, Columbia, MD (US); Darren B. Moss, York, PA (US); Mark E. Brunson, Bel Air, MD (US); David B. Lee, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 588 days.

(21) Appl. No.: 13/681,854

(22) Filed: Nov. 20, 2012

(65) Prior Publication Data
US 2013/0154205 A1    Jun. 20, 2013

Related U.S. Application Data

(60) Provisional application No. 61/570,918, filed on Dec. 15, 2011.

(51) Int. Cl.
*B23B 31/06* (2006.01)
*B23B 31/28* (2006.01)
*B25F 3/00* (2006.01)
*B25F 5/00* (2006.01)
*F16H 1/12* (2006.01)

(52) U.S. Cl.
CPC . *B23B 31/06* (2013.01); *B25F 3/00* (2013.01); *B25F 5/001* (2013.01); *F16H 1/12* (2013.01); *Y10T 74/1966* (2015.01); *Y10T 279/23* (2015.01); *Y10T 279/3412* (2015.01); *Y10T 279/3481* (2015.01)

(58) Field of Classification Search
CPC ........... B23B 31/06; B23B 31/28; B25F 3/00; B25F 5/001; F16H 1/12; Y10T 279/23; Y10T 279/3412; Y10T 279/3481
USPC .......................... 279/128, 144, 155, 143, 145
See application file for complete search history.

(56) References Cited

U.S. PATENT DOCUMENTS 1,050,385 A * 1/1913 Palmgren .............. B23B 51/123
   279/103
1,494,200 A * 5/1924 Waters .................... B25B 17/00
   81/57.29

(Continued)

FOREIGN PATENT DOCUMENTS

DE          828788 C      1/1952
DE          7407539 U    11/1974

(Continued)

*Primary Examiner* — Eric A Gates
*Assistant Examiner* — Chwen-Wei Su
(74) *Attorney, Agent, or Firm* — Scott B. Markow

(57) ABSTRACT

A right angle attachment for use with a power tool that includes a housing having a handle portion and a gear case attached to the handle portion and supporting first and second right angle gears wherein the first right angle gear is driven by an input shaft that is connected to the drill and the second right angle gear has an opening therein for receiving a hex bit directly therein. A floating magnet head can surround the hex bit to aid in fastener retention and can be movable out of proximity of the hex bit to facilitate easy removal of the hex bit for replacement. An additional magnet can be disposed within the gear case at the base of the hex bit in order to magnetize the hex bit and further enhance the retention of the fastener therein.

20 Claims, 14 Drawing Sheets

(56) References Cited

U.S. PATENT DOCUMENTS

| | | | |
|---|---|---|---|
| 2,981,545 A | 4/1961 | Hoffmeister | |
| 4,643,052 A | 2/1987 | Badiali | |
| 4,920,832 A | 5/1990 | Van Gennep | |
| 5,028,181 A | 7/1991 | Jenkins et al. | |
| 5,063,796 A | 11/1991 | Gennep | |
| 5,168,780 A | 12/1992 | Van Gennep | |
| 6,048,260 A | 4/2000 | Kopras | |
| 6,463,824 B1 | 10/2002 | Prell et al. | |
| 6,973,858 B2 | 12/2005 | Huang | |
| 7,077,736 B2 | 7/2006 | Uzumcu et al. | |
| 7,131,358 B2 | 11/2006 | Hsien | |
| 7,156,187 B1 | 1/2007 | Townsan | |
| RE40,304 E | 5/2008 | Kopras et al. | |
| 7,367,757 B2 | 5/2008 | Phillips | |
| 7,448,302 B2 | 11/2008 | Huang | |
| 7,475,740 B2 | 1/2009 | Kozina et al. | |
| 7,581,470 B1 | 9/2009 | Huang | |
| 7,779,931 B2 | 8/2010 | Townsan | |
| 7,891,275 B2 | 2/2011 | Huang | |
| 7,954,824 B2 | 6/2011 | Hu | |
| 8,172,236 B2 | 5/2012 | Shibata | |
| 8,240,233 B2 | 8/2012 | Huang | |
| 2006/0027057 A1* | 2/2006 | Hsien | B25B 23/0035 81/438 |
| 2006/0222541 A1* | 10/2006 | Greitmann | B23B 45/003 417/572 |
| 2009/0101380 A1* | 4/2009 | Radif | B25B 1/00 173/213 |
| 2009/0126960 A1* | 5/2009 | Radif | B25F 5/001 173/164 |
| 2010/0219594 A1 | 9/2010 | Nash | |
| 2011/0006489 A1 | 1/2011 | Lai | |
| 2011/0017029 A1 | 1/2011 | Chen | |
| 2011/0023666 A1 | 2/2011 | Hsu | |
| 2011/0215538 A1 | 9/2011 | Cornwell et al. | |
| 2011/0272172 A1 | 11/2011 | Lau et al. | |
| 2012/0104702 A1 | 5/2012 | Hu | |
| 2012/0126497 A1 | 5/2012 | Lin | |

FOREIGN PATENT DOCUMENTS

| | | |
|---|---|---|
| DE | 4036569 A1 | 5/1992 |
| DE | 4326652 A1 | 1/1994 |
| DE | 29912870 U1 | 11/1999 |
| DE | 19934588 A1 | 2/2001 |
| DE | 19938707 A1 | 3/2001 |
| DE | 202004004469 U1 | 5/2004 |
| DE | 202005013315 U1 | 10/2005 |
| DE | 202008003131 U1 | 9/2008 |
| EP | 1749620 A1 | 2/2007 |
| EP | 2383076 A2 | 11/2011 |

* cited by examiner

RIGHT ANGLE ATTACHMENT FOR POWER TOOLS

CROSS-REFERENCE TO RELATED APPLICATIONS

This application claims the benefit of U.S. Provisional Application No. 61/570,918, filed on Dec. 15, 2011. The entire disclosure of the above application is incorporated herein by reference.

FIELD

The present disclosure relates to a right angle attachment for power tools and more particularly, to an accessory to be attached to a power tool to allow a fastener to be inserted or a hole to be drilled in tight spaces.

BACKGROUND

Drills are widely used in the housing and other industries for drilling holes and for installing screws in various materials and in various locations. On occasion, it is necessary to drill a hole or to install a screw in a tight space that does not allow the drill to be accessed to the location for the drilling or inserting process. Accordingly, right angle accessories have been developed to help to facilitate the drilling of holes and the insertion of fasteners in these tight spaces. Although these angled accessories have been available, some of the designs are not as compact as needed to allow their use in very tight spaces.

SUMMARY

Although similar angled drive accessories have been developed for use with power tools, it is desirable to provide an improved right angle attachment for use with power tools that can work with impact tools that has improved durability and life, has an even further reduced low profile so that it can reach into the tightest of spaces, has an ergonomic design for user comfort and has superior fastener retention to help facilitate the insertion of fasteners in these tight spaces.

The present disclosure provides a right angle attachment for use with a power tool that includes a housing having a handle portion and a gear case attached to the handle portion and supporting first and second right angle gears wherein the first right angle gear is driven by an input shaft that is connected to the drill and the second right angle gear has an opening therein for receiving a hex bit directly therein. A floating magnet head can surround the hex bit to aid in fastener retention and can be movable out of proximity of the hex bit to facilitate easy removal of the hex bit for replacement. An additional magnet can be disposed within the gear case at the base of the hex bit in order to magnetize the hex bit and further enhance the retention of the fastener therein. With the hex bit being received within the second right angle gear, the drive unit can have a low profile so that it can reach into the tightest space.

According to a further aspect of the present disclosure a right angle attachment for a power tool is provided including a housing including a handle and a gear case attached to the handle. An input shaft extends through the handle. A first right angle gear is rotatably mounted within the gear case and drivingly attached to the input shaft. A second right angle gear is rotatably mounted within the gear case and meshingly engaged with the first right angle gear. The second right angle gear includes a polygonal opening therein adapted for receiving a tool bit and a magnet is disposed in the gear case inward from the polygonal cavity in the second right angle gear.

According to another aspect of the present disclosure a right angle attachment for a power tool includes a housing including a handle and a gear case attached to the handle. An input shaft extends through the handle. A first right angle gear is rotatably mounted within the gear case and drivingly attached to the input shaft. A second right angle gear is rotatably mounted within the gear case and meshingly engaged with the first right angle gear. The second right angle gear includes a polygonal opening therein adapted for receiving a tool bit and a bit release device is supported by the gear case and in communication with the polygonal opening in the second right angle gear.

One or more of the following features can be implemented with each of the above embodiments. The magnet support can include at least one boss movably received in a guide opening in the gear case.

The magnet support can include a pair of bosses movably received in a pair of guide openings in the gear case.

The magnet support can include a pair of arms slidably engaged with the gear case.

The magnet support can be pivotal relative to said gear case.

A bit release device can be supported by the gear case and in communication with the polygonal opening in the second right angle gear.

The gear case can include a Philips-shaped opening adjacent the bit release device.

The input shaft can include a pointed end that engages a surface of the gear case.

A magnet can be disposed in the gear case inward from the polygonal cavity in the second right angle gear.

The first right angle gear can be rotatably supported in the gear case by a first bearing that is supported in the gear by a first c-clip. The second right angle gear can be rotatably supported in the gear case by a second bearing that is supported in the gear case by a second c-clip.

The magnet support can be supported by a pair of shoulder screws engaged with the gear case. The pair of shoulder screws secure a first gear case portion to a second gear case portion. The second right angle gear can be secured in the gear case by a plate member that is secured to the gear case by the pair of shoulder screws.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
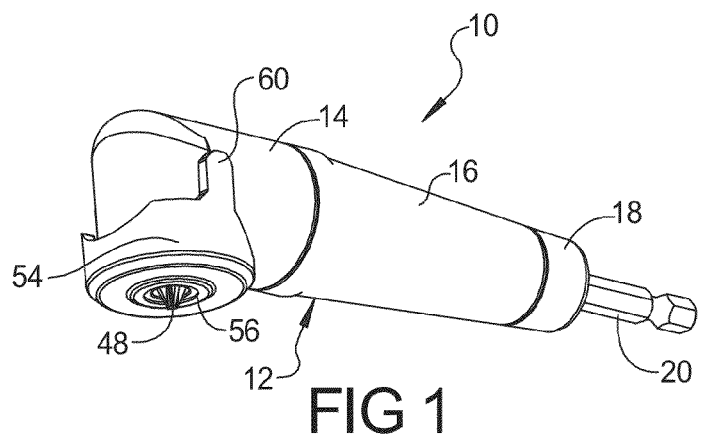
FIG. 1 is a perspective view of the right angle attachment according to the principles of the present disclosure.
Figure 2:
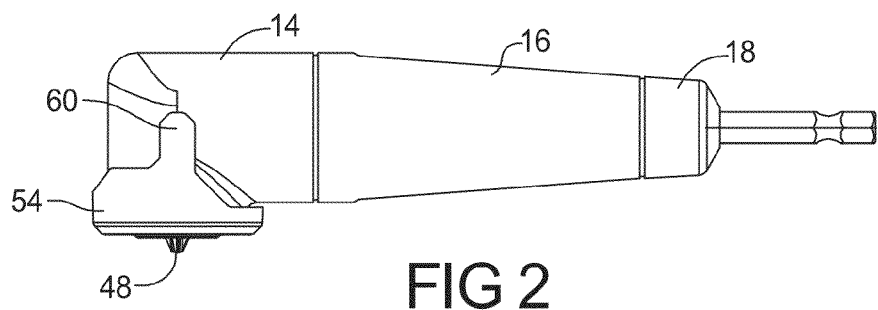
FIG. 2 is a side-plan view of the right angle attachment shown in FIG. 1.

Example embodiments will now be described more fully with reference to the accompanying drawings.

With reference to FIGS. 1-8, the right angle attachment 10 according to the principles of the present disclosure will now be described. The right angle attachment 10 includes a housing 12 including a gear case 14, a handle 16 and a rear cap 18. The gear case 14, the handle 16 and the rear cap 18 can be connected together utilizing various techniques including threaded connection, heat staking, adhesives, fasteners and other known connecting techniques. The gear case 14, handle 16 and rear cap 18 can also be made of various materials including metals and plastics.

Figure 3:
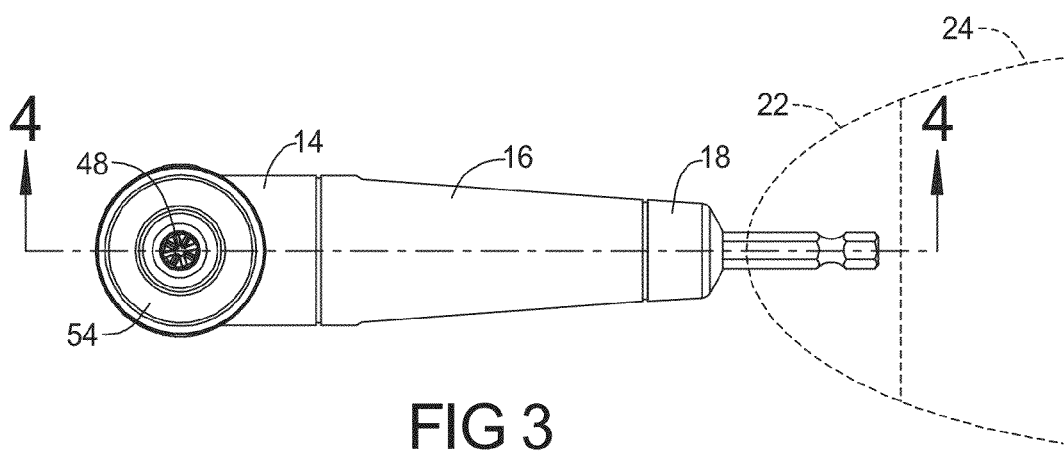
FIG. 3 is a front view of the attachment shown in FIG. 1.
Figure 4:
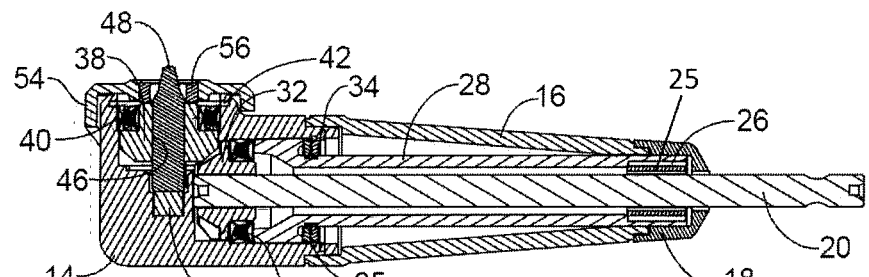
FIG. 4 is a cross-sectional view taken along line 4-4 of FIG. 3.

An input shaft 20 can be coupled to a chuck 22 of a power tool 24 each shown in phantom in FIG. 3. As best shown in FIG. 4, the input shaft 20 extends into the housing 12 where it is supported by a journal 25 and bearing 26 in the rear cap 18. An internal sleeve 28 rotatably supports the journal 25 at a first end within the rear cap 18 and extends through the handle 16 and into the gear case 14. The forward end of the internal sleeve 28 abuts against a bearing assembly 30 that rotatably supports a first right angle gear 32 on the end of the input shaft 20. The internal sleeve 28 is retained in the gear case 14 by a snap ring 34 and a spring washer 35 that engage a shoulder of the internal sleeve 28 and the snap ring 34 is received in an internal groove in the gear case 14. The spring washer 35 allows limited axial movement of the internal sleeve 28 and the first right angle gear 32.

The first right angle gear 32 is in meshing engagement with a second right angle gear 38 that rotates about an axis that is approximately 90° relative to the axis of the input shaft 20. The second right angle gear 38 is supported by a bearing assembly 40 within the gear case 14. The bearing assembly 40 is retained in the gear case 14 by a snap ring 42 received in an internal groove in the gear case 14. The second right angle gear 38 includes a hexagonal aperture 46 extending there through for receiving a hex bit 48 such as a screwdriver bit or drill bit. The screwdriver bit 48 can have a straight, Phillips or other shaped drive head. A magnet 50 is disposed within the gear case 14 at the base of the hex bit 48. The magnet 50 helps hold the bit 48 inside the gear 38 and it magnetizes the bit 48 so that it can better hold a screw.

A floating ring magnet head 54 is movably mounted to the gear case 14 and supports a ring magnet 56 around the hex bit 48 to further enhance fastener retention. The ring magnet head 54 includes a pair of pivot arms 60 on opposite sides of the gear case 14 and include an ear that is received in a slot 64 in the sides of the gear case 14 to allow axial movement of the ring magnet head 54 relative to the gear case 14.

Figure 5:
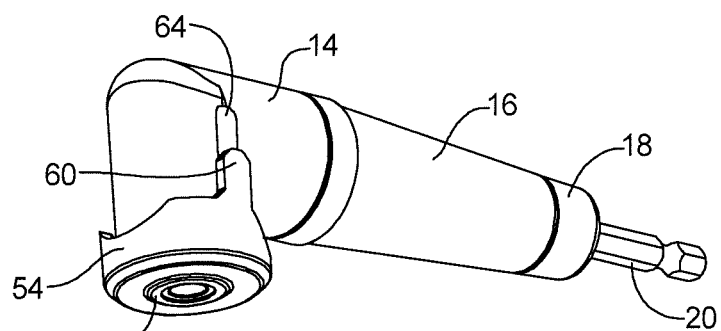
FIG. 5 is a perspective view similar to FIG. 1 showing the ring magnet head moved axially forward from the gear case.
Figure 8:
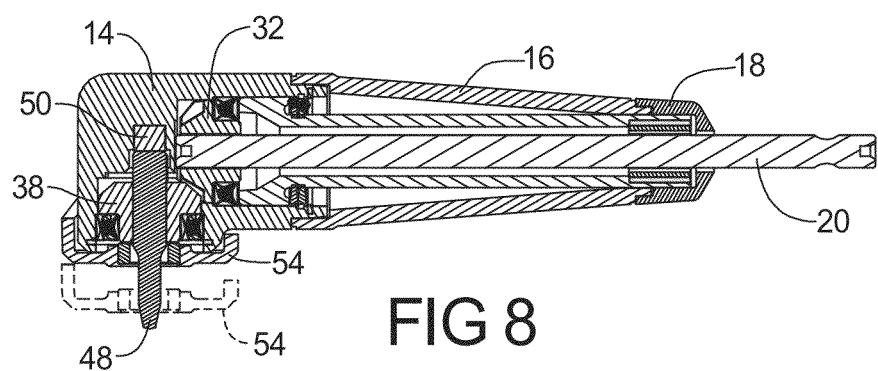
FIG. 8 is a cross-sectional view similar to FIG. 4, showing the ring magnet head moved axially away from the gear case.

In one possible embodiment, as illustrated in FIGS. 5 and 8, the ring magnet head 54 may be moved in an axial direction along the slots 64 relative to the gear case as compared to FIG. 1 wherein the ring magnet head 54 is in its retracted position. In the axial extended position illustrated in FIGS. 5 and 8, the ring magnet head 54 can help hold and magnetize the head of a screw or fastener for better retention for assembly in tight spaces. The ring magnet head 54 may include detents that engage corresponding recesses in the slots 64 to help retain the ring magnet head 54 in the axial extended position so that the right angle attachment can be operated with the head 54 in this position.

Figure 6:
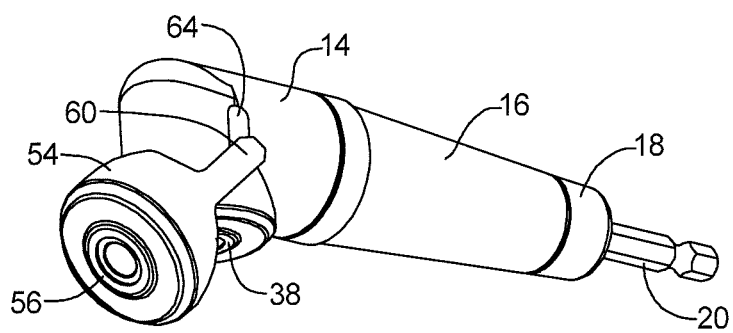
FIG. 6 is a perspective view similar to FIGS. 1 and 5, showing the ring magnet head pivoted partially out of the way of the gear case.
Figure 7:
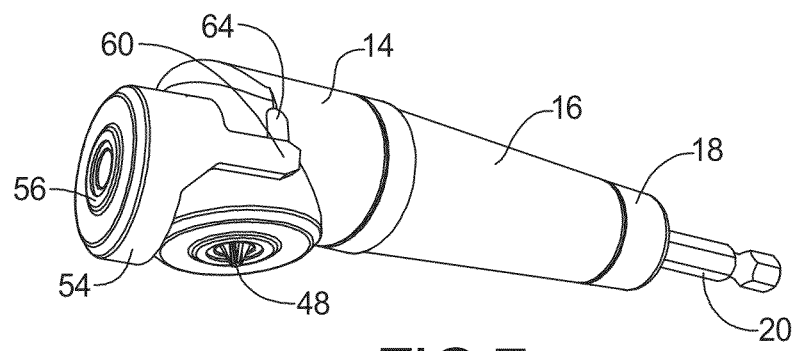
FIG. 7 is a perspective view similar to FIGS. 1, 5, and 6 showing the ring magnet head pivoted fully out of the way of the gear case.

In another possible embodiment, as illustrated in FIGS. 6 and 7, after the ring magnet head 54 is moved to its axially extended position as shown in FIG. 5, the ring magnet head 54 can be pivoted about its ears as illustrated in FIGS. 6 and 7 wherein the ring magnet head 54 is moved out of the way of the hex bit 48. The pivotal movement of the ring magnet head 54 allows for easier access for easily changing or removal of the hex bit 48 from the second right angle gear 38 especially if the bit breaks during operation.

FIG. 8 is a cross-sectional view similar to FIG. 4, but showing the ring magnet head 54 in its axially extended position relative to the gear case 14. In operation, the user inserts the input shaft 20 into the chuck 22 of a power tool 24 (best shown in FIG. 3), and inserts a bit 48 into the opening 46 in the second right angle gear 38. Driving the power tool 24 will cause the bit 48 to rotate at a right angle relative to the input shaft 20 to drive a screw or drill a hole in a very tight space.

Figure 9:
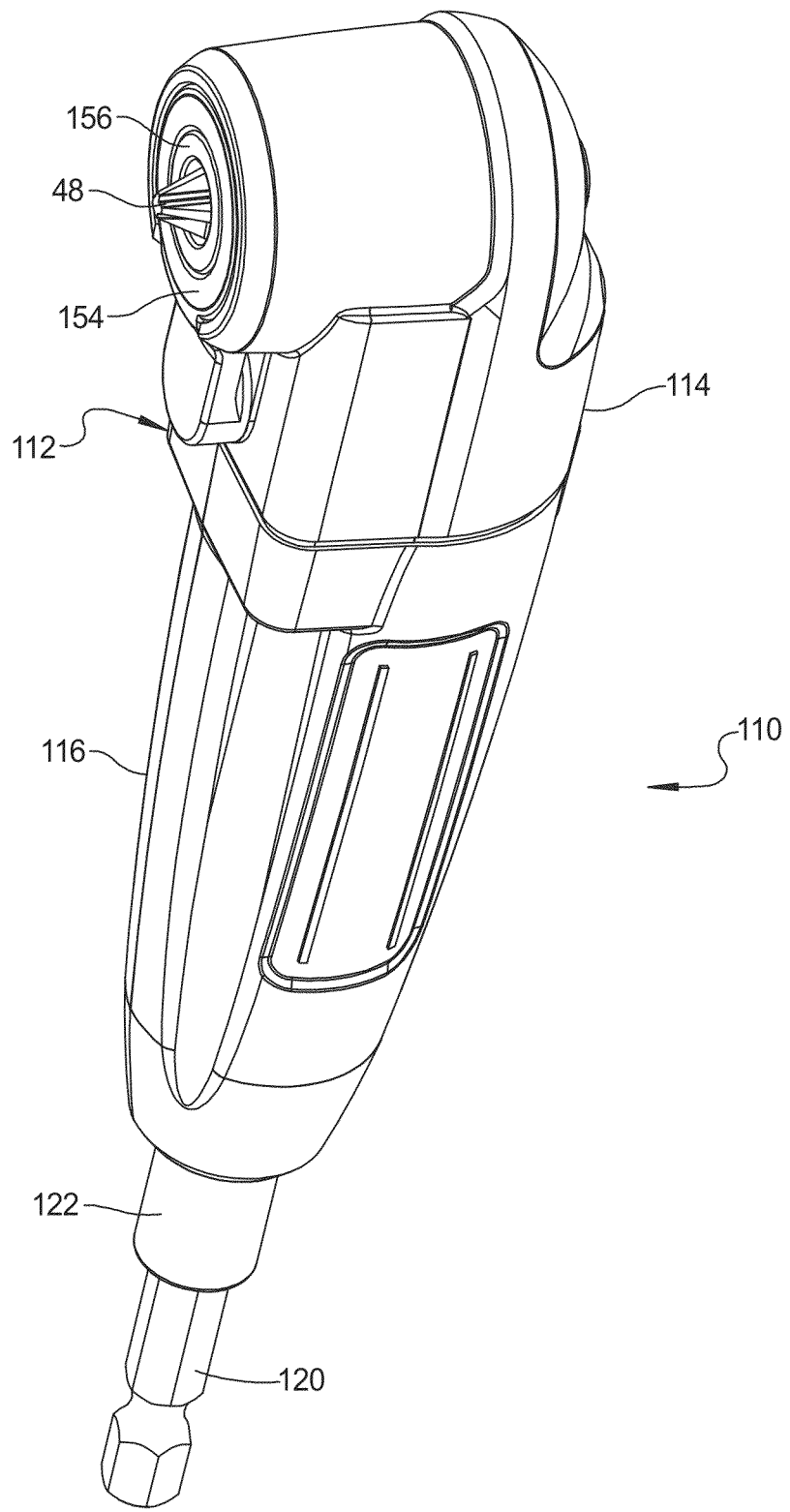
FIG. 9 is a perspective view of a right angle attachment according to a second embodiment of the present disclosure.
Figure 10:
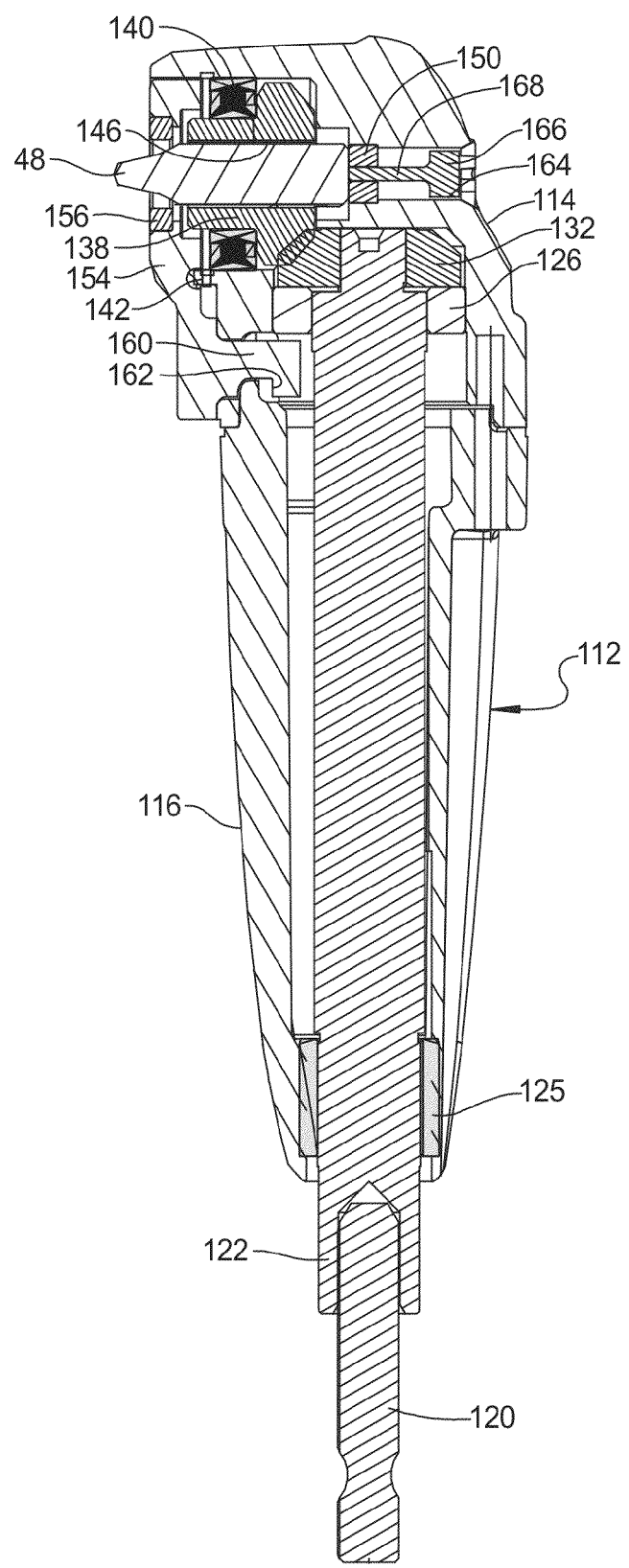
FIG. 10 is a cross-sectional view of the right angle attachment shown in FIG. 9.
Figure 11:
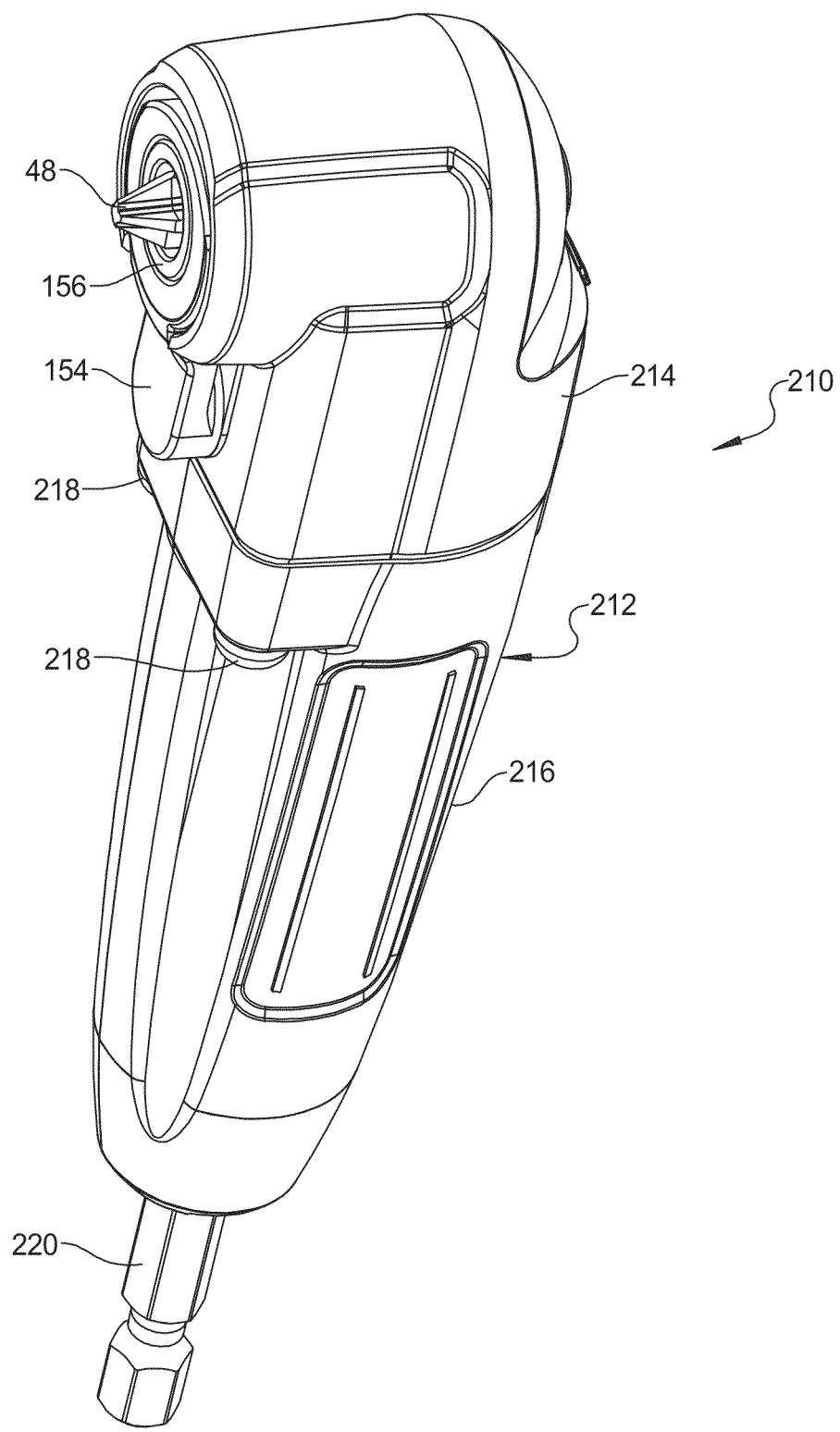
FIG. 11 is a perspective view of a right angle attachment according to a third embodiment of the present disclosure.
Figure 12:
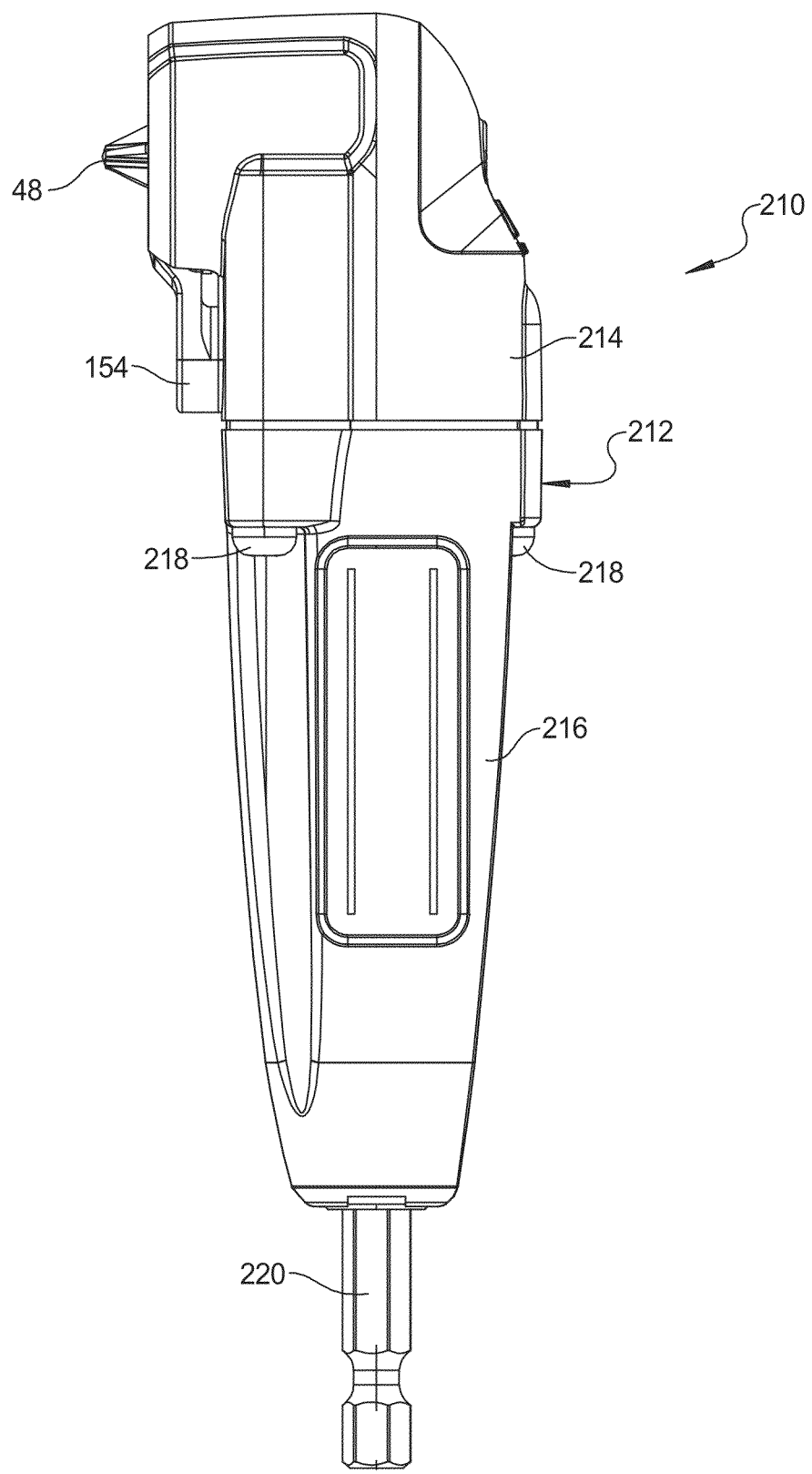
FIG. 12 is a side plan view of the right angle attachment shown in FIG. 11.
Figure 13:
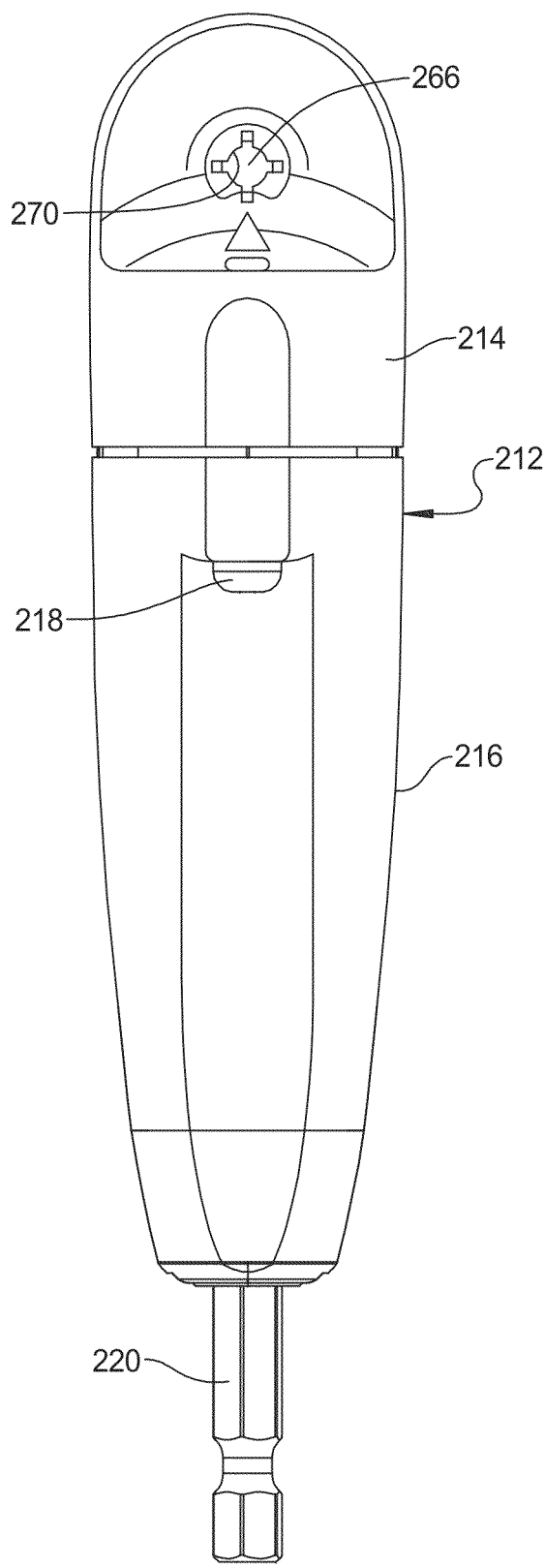
FIG. 13 is a rear plan view of the right angle attachment shown in FIG. 11.
Figure 14:
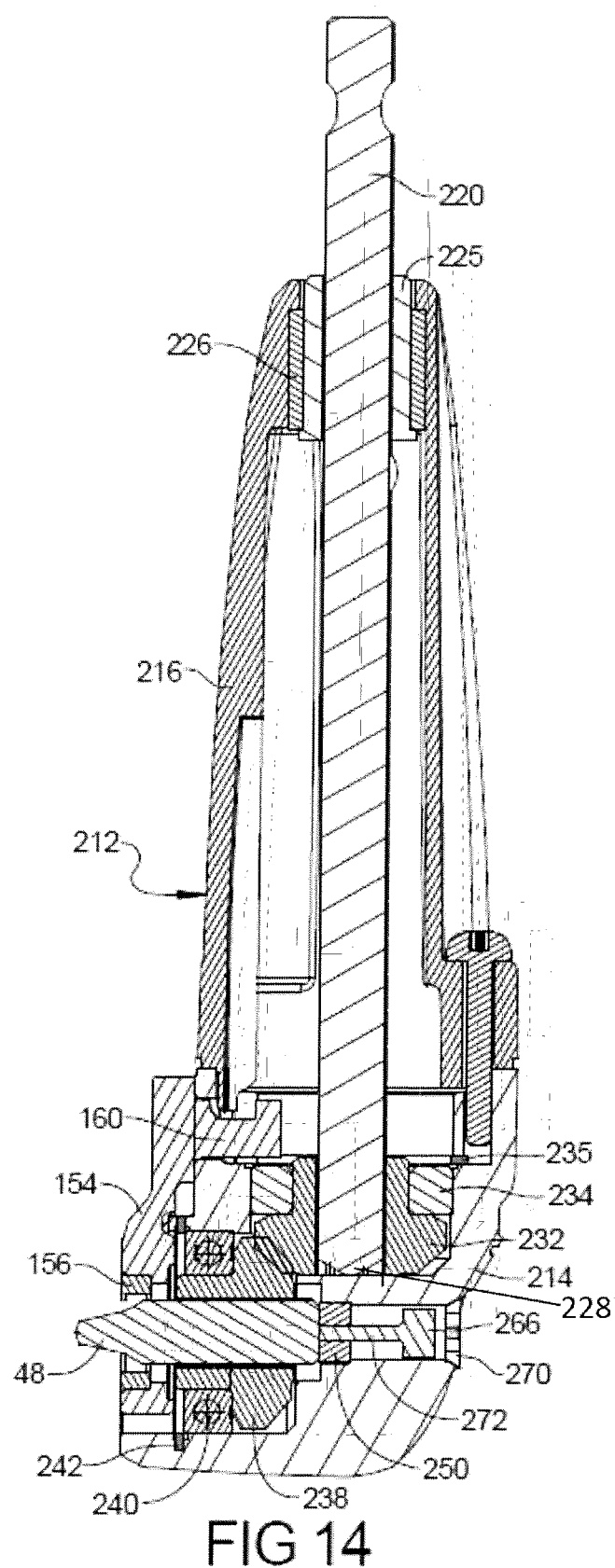
FIG. 14 is a cross-sectional view of the right angle attachment shown in FIG. 11.
Figure 15:
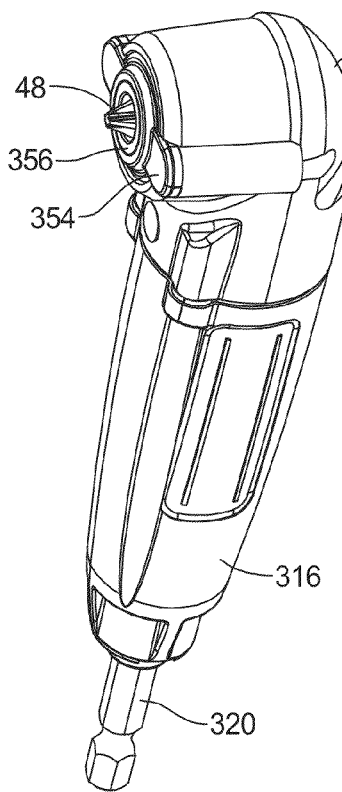
FIG. 15 is a perspective view of a right angle attachment according to a fourth embodiment of the present disclosure.

With reference to FIGS. 9 and 10, a right angle attachment 110 according to a second embodiment of the present disclosure will now be described. The right angle attachment 110 includes a housing 112 including a gear case 114 and a handle 116. In the illustrated embodiment, the handle 116 is connected to the gear case 114 by a plurality of threaded fasteners, although various techniques including threaded connection, heat staking, adhesives and other known connecting techniques can be utilized. The gear case 114 and handle 116 can be made of various materials including metals and plastics.

A hex-shaped input shaft 120 can be coupled to a chuck of a power tool. As best shown in FIG. 10, the input shaft 120 can be connected to an optional intermediate shaft 122 which extends into the housing 112 where it is supported by a rearward bearing 125 and a forward bearing 126 that are supported in the handle 116 and gear case 114, respectively. The forward end of the intermediate shaft 122 is connected to a first right angle gear 132.

The first right angle gear 132 is in meshing engagement with a second right angle gear 138 that rotates about an axis that is approximately 90° relative to the axis of the intermediate shaft 122. The second right angle gear 138 is rotatably supported by a bearing assembly 140 within the gear case 114. The bearing assembly 140 is retained in the gear case by a snap ring 142 received in an internal groove in the gear case 114. The second right angle gear 138 includes a hexagonal aperture 146 extending therethrough for receiving a hex bit 48 such as a screwdriver bit or drill bit. The screwdriver bit 48 can have a straight, Philips or other shaped drive head and a hexagonal or polygonal shaped shank. A magnet 150 is disposed within the gear case 114 at the base of the hex bit 48. The magnet 150 holds both the bit 48 inside the gear 138 and it magnetizes the bit 48 so that it can better hold a screw.

A floating ring magnet head 154 is movably mounted to the gear case 114 and supports a ring magnet 156 around the hex bit 48 to further enhance fastener retention. The floating ring magnet head 154 includes a boss 160 that is received in a guide opening 162 provided in the gear case 114 to allow axial movement of the floating ring magnet head 154 relative to the gear case 114. The gear case 114 can be provided with a hole 164 on a back side of the gear case for receiving a bit release device 166 that can be depressed to eject the hex bit 148 from the hexagonal aperture 146 in the second right angle gear 138. The bit release device 166 can include a narrow pin 168 that can extend through a hole in the magnet 150 in order to engage the hex bit 148.

With reference to FIGS. 11-14, a third embodiment of the right angle attachment 210 will now be described. The right angle attachment 210 includes a housing 212 including a gear case 214 and a handle 216. The gear case 214 and the handle 216 can be connected together utilizing various techniques, while the particular embodiment shows threaded fasteners 218 connecting the handle 216 to the gear case 214.

An input shaft 220 extends into the housing 212 where it is supported at its first end by a journal 225 and bearing 226 at the rear end of the handle 216. The forward end of the input shaft 220 has a center point 228 that engages a wall surface 229 of the gear case 214. The hex-shaped input shaft 220 is received in a hexagonal opening 230 provided in a first right angle gear 232. The first right angle gear 232 is rotatably supported by a bearing 234 that is retained within the gear case 214 by a snap ring 235.

The first right angle gear 232 is in meshing engagement with a second right angle gear 238 that rotates about an axis that is approximately 90° relative to the axis of the input shaft 220. The second right angle gear 238 is supported by a bearing assembly 240 within the gear case 214. The bearing assembly 240 is retained in the gear case 214 by a snap ring 242 received in an internal groove in the gear case 214. The second right angle gear 238 includes a hexagonal aperture 246 extending therethrough for receiving a hex bit 48 such as a screwdriver bit or drill bit. The screwdriver bit 48 can have a straight, Philips or other shaped drive head. A magnet 250 is disposed within the gear case 214 at the base of the hex bit 48. The magnet 250 helps hold the bit 48 inside the gear 238 and it magnetizes the bit 48 so that it can better hold a screw.

A floating ring magnet head 154 is movably mounted to the gear case 214 and supports a ring magnet 156 around the hex bit 48 to further enhance fastener retention. The structure of the floating magnet holder 154 is described above with respect to the prior embodiment shown in FIGS. 9 and 10 and further description will therefore not be provided with regard to floating ring magnet head 154.

A bit release device 266 is received in an opening 268 provided in gear case 214 on the back side of the hex bit 48. The bit release device can include an elongated pin 272 that can extend through an opening in the magnet 250 in order to press the hex bit 48 out of the hexagonal aperture 246 of the second right angle gear 238. The gear case 214 can be provided with a Philips-shaped access hole that allows the head of a Philips-shaped bit or a straight bit to be inserted therethrough to engage the bit release device 266 to aid in the release of the hex bit 48.

It is noted that the pointed tip feature 228 of the hex-shaped input shaft 220 aids in centering the shaft to prevent misalignment of the shaft 220 which can result in binding in the rotating gear elements 232, 238. This improvement provides a simple, low cost solution to enable larger tolerances in production of the right angle attachment 210.

With reference to FIGS. 15-18, a right angle attachment 310 according to a fourth embodiment of the present disclosure will now be described. The right angle attachment 310 includes a housing 312 including a gear case 314 and a handle 316.

Figure 16:
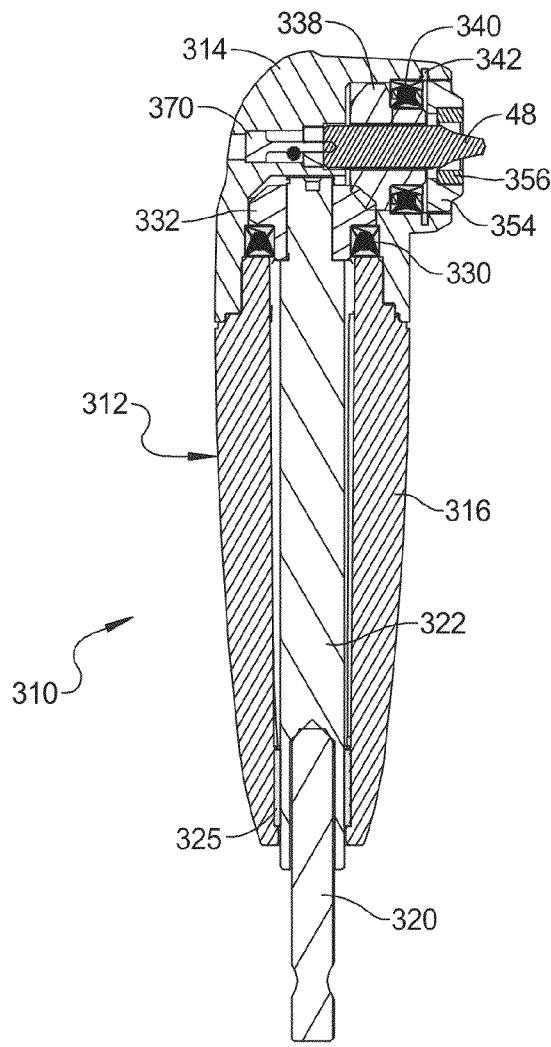
FIG. 16 is a cross-sectional view of the right angle attachment shown in FIG. 15.

An input shaft 320 can be coupled to an intermediate shaft 322 as best illustrated in FIG. 16. The intermediate shaft 322 can be rotatably supported by a journal/bearing 325 disposed at the rearward end of the handle 316, as best shown in FIG. 16. A first right angle gear 332 can be supported at the forward end of the intermediate shaft 322. The first right angle gear 332 can be rotatably supported by a bearing assembly 330 that is received in the gear case 314. The bearing assembly 330 can be supported within the gear case 314 by a snap ring received in an internal groove in the gear case 314.

The first right angle gear 332 is in meshing engagement with a second right angle gear 338 that rotates about an axis that is approximately 90° relative to an axis of the intermediate shaft 322. The second right angle gear 338 is rotatably supported within the gear case 314 by a bearing assembly 340 that is retained in the gear case 314 by a snap ring 342 received in an internal groove in the gear case 314. The second right angle gear 348 includes a hexagonal aperture 346 extending therethrough for receiving a hex bit 48 such as a screwdriver bit or drill bit. A magnet 350 can be disposed within the gear case 314 at the base of the hex bit 48. The magnet 350 helps hold the bit 48 inside the second right angle gear 338 and it magnetizes the bit 48 so that it can better hold a screw.

A floating ring magnet head 354 is movably mounted to the gear case 314 and supports a ring magnet 356 around the hex bit 48 further enhancing fastener retention. The floating ring magnet head 354 includes a pair of bosses 360 on opposite sides of the gear case 314 that are each received within a pair of guide channels 362 formed in the gear case 314. The guide channels 362 and bosses 360 allow the magnet support head 354 to move axially by a limited amount to allow the ring magnet 356 to be moved in an axial direction relative to the gear case 314 to help hold and magnetize the head of a screw or a fastener for better retention for assembly in tight spaces. Each boss 360 can be provided with a head portion 364 that can engage a stop within the guide channels 362 to limit the axial movement therein.

Figure 17:
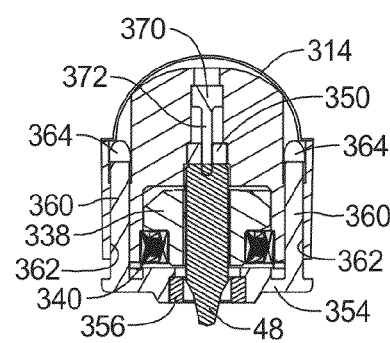
FIG. 17 is a cross-sectional view taken along line 17-17 of FIG. 16.
Figure 18:
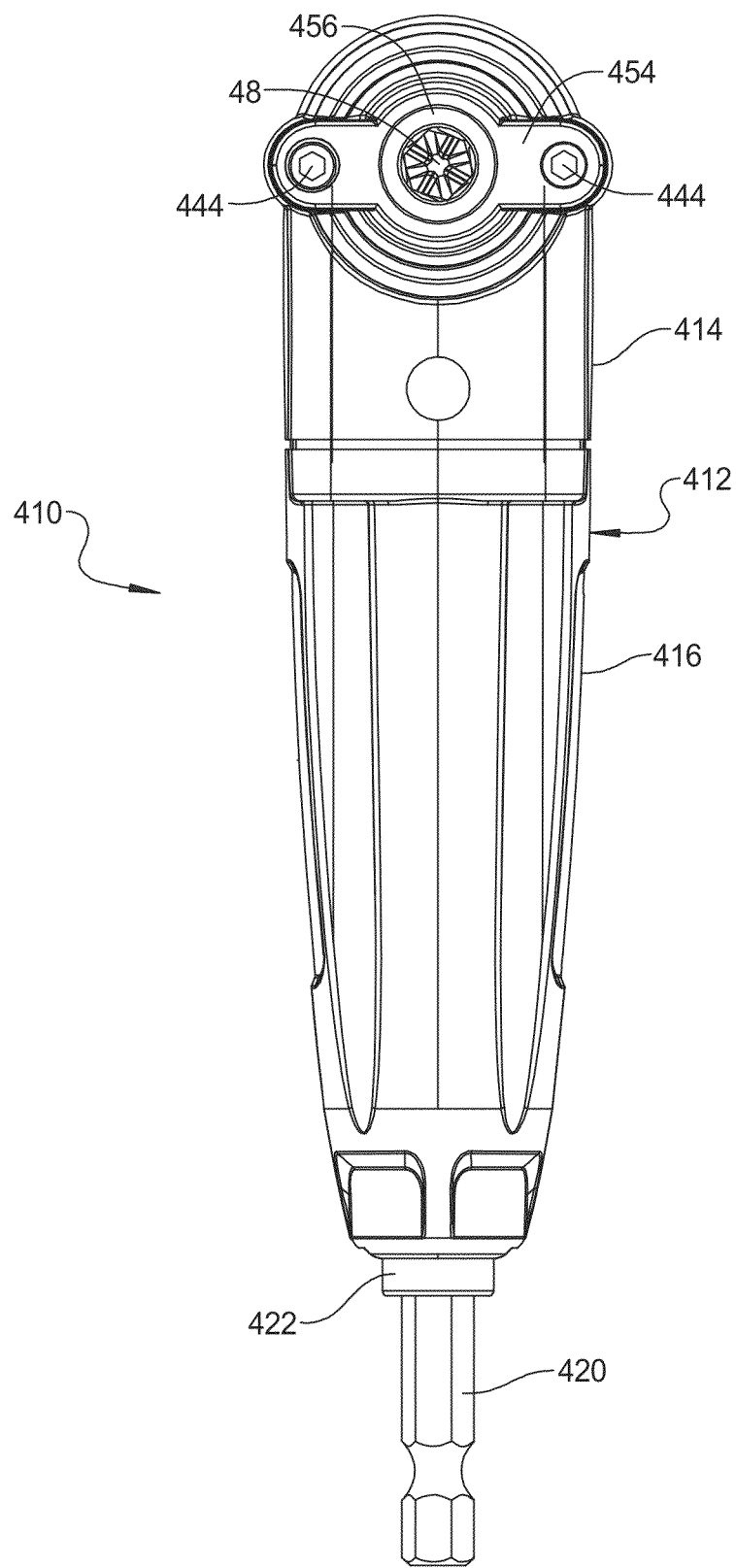
FIG. 18 is a front plan view of a right angle attachment according to a fifth embodiment of the present disclosure.
Figure 19:
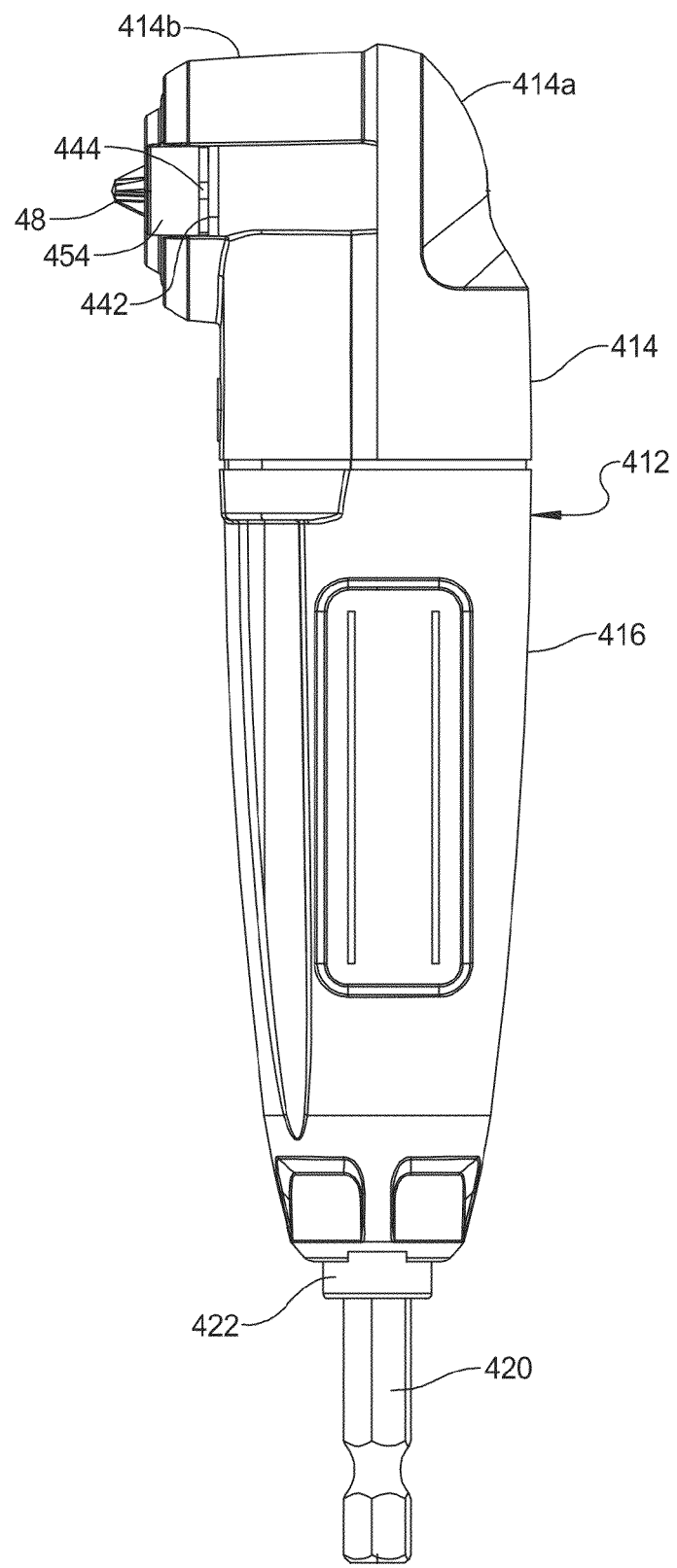
FIG. 19 is a side plan view of the right angle attachment shown in FIG. 18 with the floating magnet holder in a retracted position.
Figure 20:
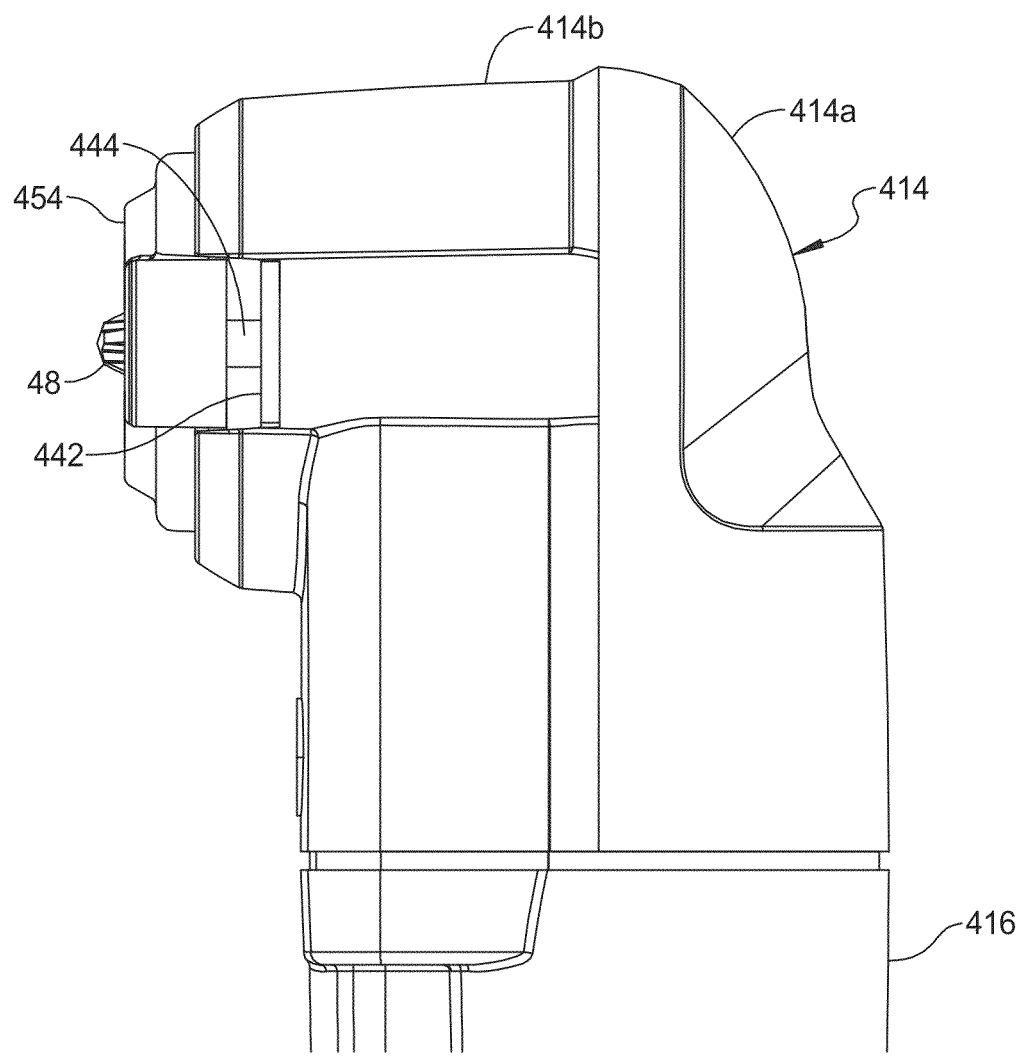
FIG. 20 is a side plan view similar to FIG. 19, and showing the floating magnet holder in an extended position.

A quick release device 370 can be provided on the rear surface of the gear case 314 to allow the device to be pressed in order to assist in removing a hex bit 48 from the hexagonal aperture 346 in the second right angle gear 338. The release device 370 can include an elongated pin 372 that extends through an opening in the magnet 350 as best shown in FIGS. 16 and 17 in order to assist in removal of a hex bit 48.

Figure 21:
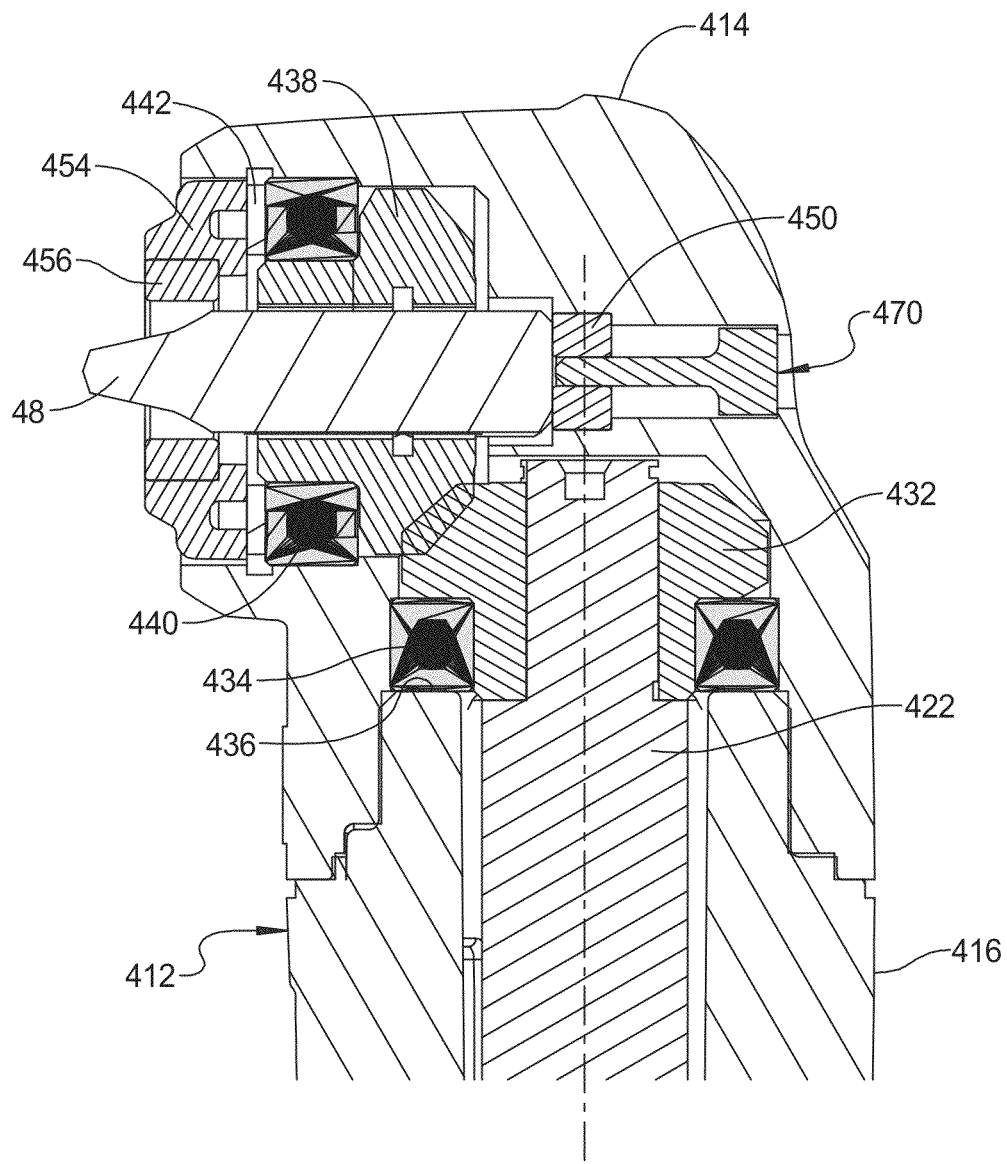
FIG. 21 is a cross-sectional view of the right angle attachment shown in FIG. 18.

With references to FIGS. 18-21, a right angle attachment 410 according to a fifth embodiment of the present disclosure will now be described. The right angle attachment 410 includes a housing 412 including a gear case 414 and a handle 416. The gear case 414 and handle 416 can be connected together by entrapping the handle 416 between first and second gear case portions 414a, 414b or by utilizing various alternative techniques including threaded connection, heat-staking, adhesives, fasteners, and other known connecting techniques. A hex-shaped input shaft 420 can be connected to an intermediate shaft 422 which is drivingly connected to a first right angle gear 432 as best illustrated in FIG. 21.

The first right angle gear 432 can be supported within the gear case 414 by a bearing assembly 434 that can be retained within the gear case 414 by an end 436 of the handle 416. The first right angle gear 432 is in meshing engagement with a second right angle gear 438 that rotates about an axis that is approximately 90° relative to the axis of the intermediate shaft 422. The second right angle gear 438 is supported by a bearing assembly 440 within the gear case 414. The bearing assembly 440 is retained in the gear case 414 by a plate 442.

The plate 442 is secured to the gear case 414 by a pair of shoulder screws 444. The shoulder screws 444 include a shoulder portion that abuts against the plate 442 while the screws are threaded into a first gear case portion 414a for securing a second gear case portion 414b thereto. Thus, the shoulder screws 444 are provided for securing the gear case portions 414a, 414b together while also securing the plate 442 against the bearing assembly 440 for securing the components within the gear case 414. The shoulder screws 444 also support a floating magnet head 454 for movement relative to the gear case 414. The floating ring magnet head 454 supports a ring magnet 456 around the hex bit 48 to further enhance fastener retention. The floating ring magnet head 454 slides along a smooth surface of the shoulder screws 444 and abut against a head at an end thereof that limits the axial movement of the floating ring magnet head 454. A magnet 450 can be disposed within the gear case 414 at the base of the hex bit 48. The magnet 450 can help hold the bit 48 inside the gear 438 and it magnetizes the bit 48 so that it can better hold a screw.

This design utilizes two shoulder screws to tie the floating ring magnet support 454 and metal plate 442 and gear case 414 together. As the first and second gear case components 414a, 414b are sandwiched around the handle 416, the handle 416 becomes entrapped therein. This creates a unique package that is easy to assemble and disassemble for repair.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A right angle attachment for a power tool, comprising:
a housing including a handle and a gear case attached to the handle;
an input shaft extending through the handle;
a first right angle gear rotatably mounted within the gear case and drivingly attached to said input shaft;
a second right angle gear rotatably mounted within the gear case about a rotational axis and meshingly engaged with said first right angle gear, said second right angle gear having a polygonal opening therein adapted for receiving a tool bit; and
a ring magnet supported in a location forward of said polygonal opening, wherein said ring magnet is supported by a magnet support that is movable axially along the rotational axis relative to said gear case during operation of the right angle attachment.

2. The right angle attachment according to claim 1, wherein said magnet support includes at least one boss movably received in a guide opening in said gear case.

3. The right angle attachment according to claim 1, wherein said magnet support includes a pair of bosses movably received in a pair of guide openings in said gear case.

4. The right angle attachment according to claim 1, wherein said magnet support includes a pair of arms slidably engaged with said gear case.

5. The right angle attachment according to claim 4, wherein said magnet support is pivotal relative to said gear case.

6. The right angle attachment according to claim 1, further comprising a bit release device supported by said gear case and in communication with said polygonal opening in said second right angle gear.

7. The right angle attachment according to claim 6, wherein said gear case includes a Philips-shaped opening adjacent said bit release device.

8. The right angle attachment according to claim 1, wherein said input shaft includes a pointed end that engages a surface of said gear case.

9. The right angle attachment according to claim 1, further comprising a magnet disposed in said gear case inward from said polygonal cavity in said second right angle gear.

10. The right angle attachment according to claim 1, wherein said first right angle gear is rotatably supported in said gear case by a first bearing that is supported in said gear by a first snap ring.

11. The right angle attachment according to claim 10, wherein said second right angle gear is rotatably supported in said gear case by a second bearing that is supported in said gear case by a second snap ring.

12. The right angle attachment according, to claim 1, wherein said magnet support is supported by a pair of shoulder screws engaged with said gear case.

13. The right angle attachment according to claim 12, wherein said pair of shoulder screws secure a first gear case portion to a second gear case portion.

14. The right angle attachment according to claim 13, wherein said second right angle gear is secured in said gear case by a plate member that is secured to said gear case by said pair of shoulder screws.

15. An angle attachment for use with a rotary tool, the angle attachment comprising:
a housing including a gear case portion;
an input shaft extending through the housing in a first axial direction;
a first bevel gear rotatably mounted about a first axis within the gear case and drivingly attached to said input shaft;
a second bevel gear rotatably mounted within the gear case about a second rotational axis at an angle to the first rotational axis, the second bevel gear meshingly engaged with said first bevel gear;
a tool bit holder drivingly coupled to the second bevel gear and configured to retain a fastening tool bit; and
a ring magnet supported in a location axially forward of the second bevel gear along the second rotational axis, wherein the ring magnet is movable axially along the second rotational axis during operation of the angle attachment to magnetically engage a fastener being driven by a fastening tool bit retained by the tool bit holder.

16. The angle attachment of claim 15, wherein the tool bit holder comprises a bore extending along the second rotational axis for receiving a tool bit.

17. The angle attachment of claim 16, wherein the bore is disposed at least partially in the second bevel gear.

18. The angle attachment of claim 17, further comprising a magnet disposed at an axially rearward end of the bore.

19. The angle attachment of claim 15, wherein the second rotational axis is at a right angle to the first rotational axis.

20. The angle attachment of claim 15, further comprising a bit release pin disposed in an opening in the gear case and moveable axially along the rotational axis to release a bit from the tool bit holder.

* * * * *